H. THOMPSON.
TIRE.
No. 170,786. Patented Dec. 7, 1875.
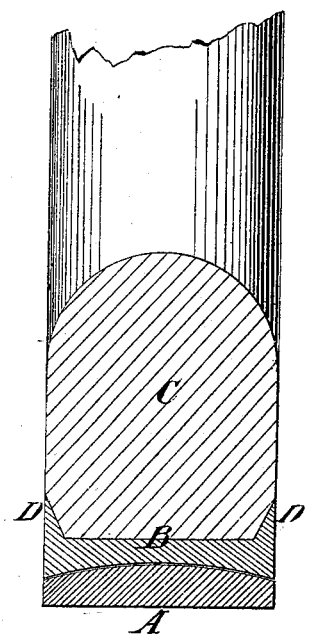
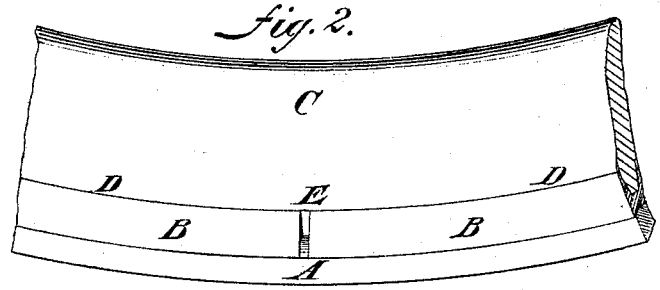
WITNESSES:
INVENTOR:
H. Thompson
BY
ATTORNEYS.

UNITED STATES PATENT OFFICE.

HARRY THOMPSON, OF DECATUR, INDIANA, ASSIGNOR TO HIMSELF AND GEORGE W. McCONNELL, OF SAME PLACE.

IMPROVEMENT IN TIRES.

Specification forming part of Letters Patent No. 170,786, dated December 7, 1875; application filed November 13, 1875.

*To all whom it may concern:*

Be it known that I, HARRY THOMPSON, of Decatur, in the county of Adams and State of Indiana, have invented a new and Improved Wheel-Tire, of which the following is a specification:

The invention consists of an outer and an inner rim or band forming the tire, the inner one having an inwardly-projecting flange at each edge, to protect the sides of the felly, and to keep the tire on the wheel, and the outer one being to bind the inner over fast to the wheel, it being necessarily unconnected at the ends to apply it on account of the flanges. The outer one is kept on by a convex inner face, which shrinks into the concave outer face of the inner one.

Figure 1 is a section of the felly and tire, and Fig. 2 is a side elevation of a portion of a rim of the wheel.

Similar letters of reference indicate corresponding parts.

A is the outer rim of the tire, which has a convex inner face, and is welded together like ordinary tires, making an endless rim. B is the inner rim, which has flanges D fitting the sides of the felly, and is unconnected at the ends E, and has a concave outer face to receive the outer rim and hold it firmly on the wheel. The outer rim shrinks on the inner one, and draws it on the felly tightly, so that its flanges keep it in place.

Having thus described my invention, I claim as new and desire to secure by Letters Patent—

The combination of the open, concave, and flanged rim B, and the endless convex rim A, with the felly-rim C, substantially as specified.

HARRY THOMPSON.

Witnesses:
SAML. C. BOLLMAN,
JOHN P. QUINN.